US011777602B2

(12) United States Patent
Pabouctsidis et al.

(10) Patent No.: US 11,777,602 B2
(45) Date of Patent: Oct. 3, 2023

(54) APPARATUS AND METHOD FOR ARBITRATING OPTICAL COMMUNICATION BETWEEN CAN BUSES

(71) Applicant: Nidec Motor Corporation, St. Louis, MO (US)

(72) Inventors: Cosma Pabouctsidis, Geneva (CH); Christopher J. Schur, Payson, AZ (US)

(73) Assignee: Nidec Motor Corporation, St. Louis, MO (US)

( * ) Notice: Subject to any disclaimer, the term of this patent is extended or adjusted under 35 U.S.C. 154(b) by 79 days.

(21) Appl. No.: 17/550,868

(22) Filed: Dec. 14, 2021

(65) Prior Publication Data

US 2023/0147632 A1    May 11, 2023

(30) Foreign Application Priority Data

Nov. 9, 2021   (GR) ................................ 2021010084

(51) Int. Cl.
*H04B 10/114* (2013.01)
*H04L 12/40* (2006.01)
*H04W 4/48* (2018.01)

(52) U.S. Cl.
CPC .......... *H04B 10/1143* (2013.01); *H04L 12/40* (2013.01); *H04W 4/48* (2018.02); *H04L 2012/40215* (2013.01)

(58) Field of Classification Search
CPC ................................................. H04B 10/1143
See application file for complete search history.

(56) References Cited

U.S. PATENT DOCUMENTS 5,677,671 A    10/1997  Pabla et al.
5,914,796 A *  6/1999   Selin ............... H04B 10/1143
                                                            398/118
(Continued)

FOREIGN PATENT DOCUMENTS

JP    2009142115      6/2009
KR    1020100055920   5/2010
WO    WO2008/062801  *  5/2008   ............. B61B 13/00

OTHER PUBLICATIONS

International Search Report and Written Opinion for PCT Application No. PCT/US2022/049302, dated Mar. 21, 2023.

(Continued)

*Primary Examiner* — Nathan M Cors
(74) *Attorney, Agent, or Firm* — Hovey Williams LLP

(57) ABSTRACT

An apparatus and method arbitrates bidirectional optical communication across optical link ends of independent controller area network buses. A mobile device has a battery management system and a first controller area network bus having a first optical link end, and a charging station has a second controller area network bus having a second optical link end. When the mobile device aligns with the charging station for charging, the optical links ends align to allow communication between the battery management system and the charging station regarding charging the battery. The arbiter apparatus is operationally interposed between the optical link ends and arbitrates the bidirectional communication by delaying a subsequent communication from one of the battery management system and the charging station until a dominant bit of a prior communication is released, thereby preventing the controller area network buses from transmitting simultaneously across the optical link ends.

17 Claims, 4 Drawing Sheets

(56) References Cited

U.S. PATENT DOCUMENTS

| | | | |
|---|---|---|---|
| 9,114,536 B2 | 8/2015 | Sussman | |
| 9,493,087 B2 | 11/2016 | Leary | |
| 9,614,466 B2 | 4/2017 | Usselman et al. | |
| 2005/0179416 A1 | 8/2005 | Iribe et al. | |
| 2010/0185357 A1* | 7/2010 | Mizumachi | B60L 53/14 |
| | | | 701/31.4 |
| 2012/0041855 A1* | 2/2012 | Sterling | B60L 53/52 |
| | | | 320/109 |
| 2013/0220726 A1 | 8/2013 | Satou et al. | |
| 2016/0141865 A1 | 5/2016 | Drake et al. | |
| 2018/0069493 A1 | 3/2018 | Roberts | |
| 2019/0050697 A1* | 2/2019 | Meng | G06K 19/0723 |
| 2020/0041609 A1* | 2/2020 | Ames | G01S 17/931 |
| 2020/0070032 A1 | 3/2020 | Orady et al. | |
| 2020/0389103 A1 | 12/2020 | Trencseni et al. | |
| 2021/0084812 A1 | 3/2021 | Matus et al. | |
| 2021/0206279 A1 | 7/2021 | North et al. | |
| 2021/0210965 A1 | 7/2021 | Roumi et al. | |
| 2023/0079247 A1* | 3/2023 | Moloney | B60L 53/305 |
| | | | 320/109 |

OTHER PUBLICATIONS

Mauer, Thomas "TI Designs: TIDA-01487—Isolated CAN FD Repeater Reference Design," Texas Instruments Incorporated (2018).
Office Action from U.S. Appl. No. 17/550,928 entitled Safety Switching System and Method for Braking Electric Motor, dated Mar. 20, 2023.

* cited by examiner

APPARATUS AND METHOD FOR ARBITRATING OPTICAL COMMUNICATION BETWEEN CAN BUSES

FIELD

The present invention relates to systems and methods for facilitating wireless optical communication, and more particularly, embodiments concern an apparatus and method for facilitating bidirectional wireless optical communication between independent controller area network buses by arbitrating transmit and receive processes.

BACKGROUND

Wired controller area network (CAN) buses may be used to facilitate electronic communication between hosts and peripherals. In particular, CAN buses may be used for communication between components within vehicles. Between these components, a two-wire CAN bus may be bidirectionally driven and a dominant bit (low or "0" condition) on the bus line dominates the bus to transmit data from one component to another on the same bus. However, this solution, by itself, is not sufficient to facilitate bidirectional wireless communication between independent CAN buses attempting to transmit simultaneously.

This background discussion is intended to provide information related to the present invention which is not necessarily prior art.

SUMMARY

Embodiments of the present invention address the above-described and other problems and limitations in the prior art by providing an apparatus and method for facilitating bidirectional wireless optical communication between independent CAN buses by arbitrating transmit and receive processes to prevent the CAN buses from transmitting simultaneously across the optical link ends.

In one embodiment of the present invention, a system may comprise a mobile device, a charging station, and an arbiter apparatus. The mobile device may include a battery configured to provide power to an electric motor and a battery management system configured to monitor the battery, and the battery management system may be configured to communicate via a first CAN bus having a first optical link end. The charging station may be configured to charge the battery, and the charging station may be configured to communicate via a second CAN bus having a second optical link end. When the mobile device is operationally aligned with the charging station for charging the battery, the first and second CAN buses may be operationally aligned and configured to allow for bidirectional optical communication across the first and second optical link ends between the battery management system and the charging station regarding charging the battery. The arbiter apparatus may be operationally interposed between the first and second optical link ends and configured to arbitrate the bidirectional optical communication via the first and second optical link ends by delaying a subsequent optical communication from one of the battery management system and the charging station until a prior optical communication from an other of the battery management system and the charging station has concluded.

In another embodiment of the present invention, a system may be provided for arbitrating bidirectional optical communication between a mobile device and a charging station. The mobile device may include a battery configured to provide power to an electric motor and a battery management system configured to monitor the battery, and the battery management system may be configured to communicate via a first CAN bus having a first optical link end. The charging station may be configured to charge the battery, and the charging station may be configured to communicate via a second CAN bus having a second optical link end. When the mobile device is operationally aligned with the charging station for charging the battery, the first and second CAN buses may be operationally aligned and configured to allow for bidirectional optical communication across the first and second optical link ends between the battery management system and the charging station regarding charging the battery. The system may comprise an arbiter apparatus operationally interposed between the first and second optical link ends and configured to arbitrate the bidirectional optical communication via the first and second optical link ends by delaying a subsequent optical communication from one of the battery management system and the charging station until a prior optical communication from an other of the battery management system and the charging station has concluded.

In another embodiment of the present invention, a method may be provided for arbitrating bidirectional optical communication between a mobile device and a charging station. The mobile device may include a battery configured to provide power to an electric motor and a battery management system configured to monitor the battery, and the battery management system may be configured to communicate via a first CAN bus having a first optical link end. The charging station may be configured to charge the battery, and the charging station may be configured to communicate via a second CAN bus having a second optical link end. When the mobile device is operationally aligned with the charging station for charging the battery, the first and second CAN buses may be operationally aligned and configured to allow for bidirectional optical communication across the first and second optical link ends between the battery management system and the charging station regarding charging the battery. The method may comprise interposing an arbiter apparatus between the first and second optical link ends and arbitrating with the arbiter the bidirectional optical communication via the first and second optical link ends by delaying a subsequent optical communication from one of the battery management system and the charging station until a prior optical communication from an other of the battery management system and the charging station has concluded.

Various implementations of the foregoing embodiments may include any one or more of the following features. The mobile device may be an automated guided vehicle or an autonomous mobile robot. The bidirectional optical communication between the battery management system and the charging station may concern optimizing power delivery to the battery. The arbiter apparatus may prevent the subsequent optical communication from the one of the battery management system and the charging station from proceeding until a dominant bit of the prior optical communication from the other of the battery management system and the charging station is released, thereby preventing the first and second CAN buses from transmitting simultaneously across the first and second optical link ends.

The mobile device may include a collector, the first optical link end may be part of the collector, and the first optical link end may include a first transmit light emitting diode and a first receive photodiode. The charging station may include a base configured to cooperate with the collector to charge the battery, the second optical link end may be part of the base, and the second optical link end may include a second transmit light emitting diode and a second receive photodiode. The mobile device may move to the charging station such that the collector is proximate to the base and the first optical link end is aligned with the second optical link end.

The collector may include one or more electrical contact pads, which are extendable to make electrical contact with the base and retractable to break electrical contact with the base, and at least one collector magnet, and the base may include at least one base magnet. When the mobile device moves to the charging station such that the collector magnet is proximate to the base magnet the one or more electrical contact pads may extend for charging the battery, and when the mobile device moves away from the charging station such that the collector magnet is no longer proximate to the base magnet the one or more electrical contact pads may retract.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

Figure 1:
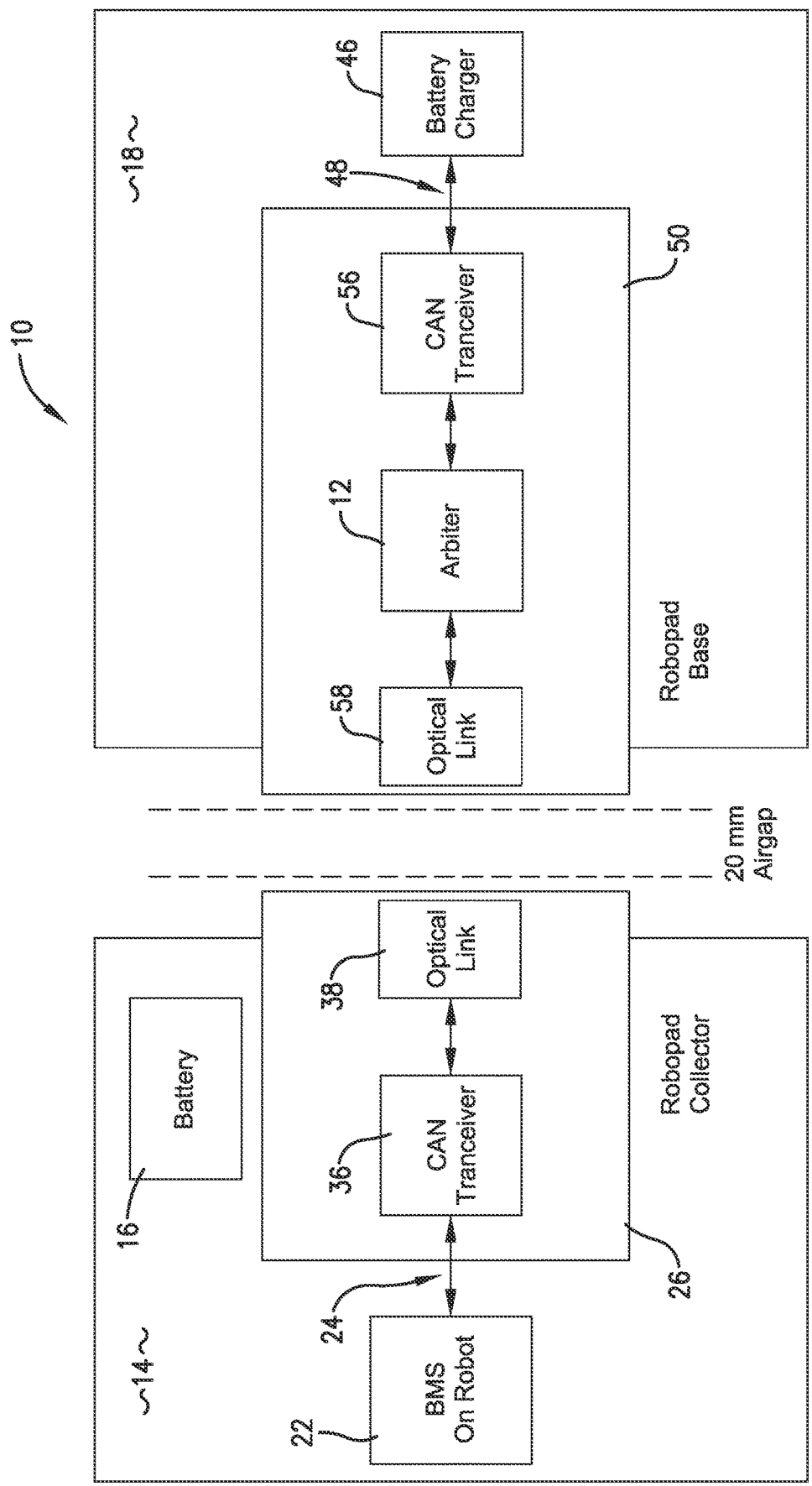
FIG. 1 is a high-level block diagram of components in an embodiment of a system for arbitrating bidirectional optical communication between a mobile device and a charging station.
Figure 2:
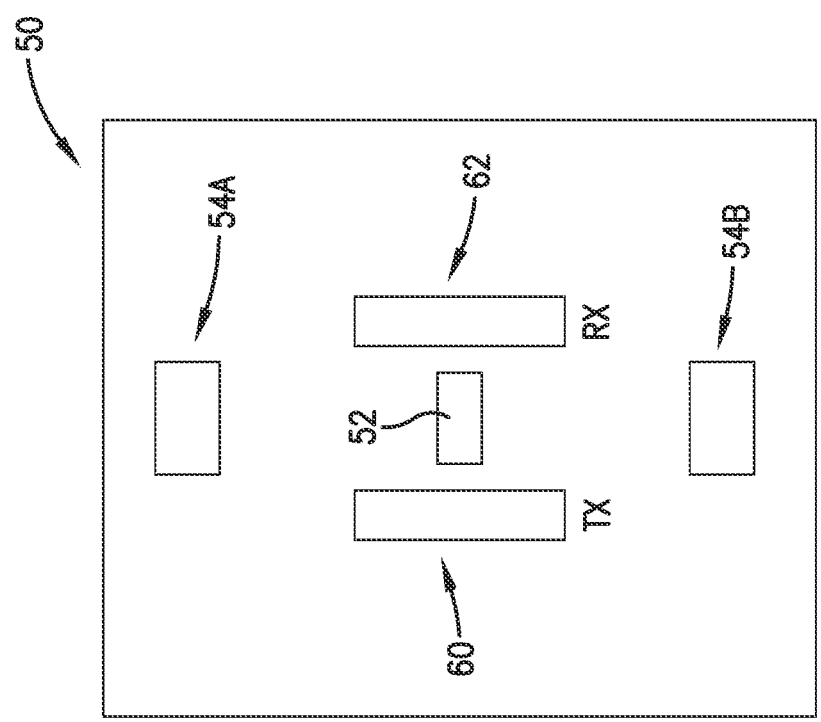
FIG. 2 is a bottom view of an implementation of a collector component of the mobile device of FIG. 1.
Figure 3:
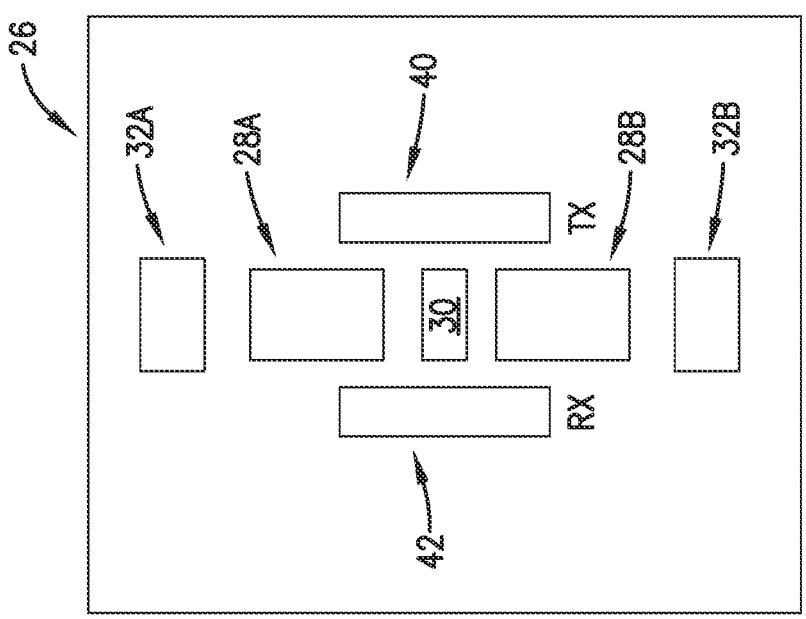
FIG. 3 is a plan view of an implementation of a base component of the charging station of FIG. 1.
Figure 4:
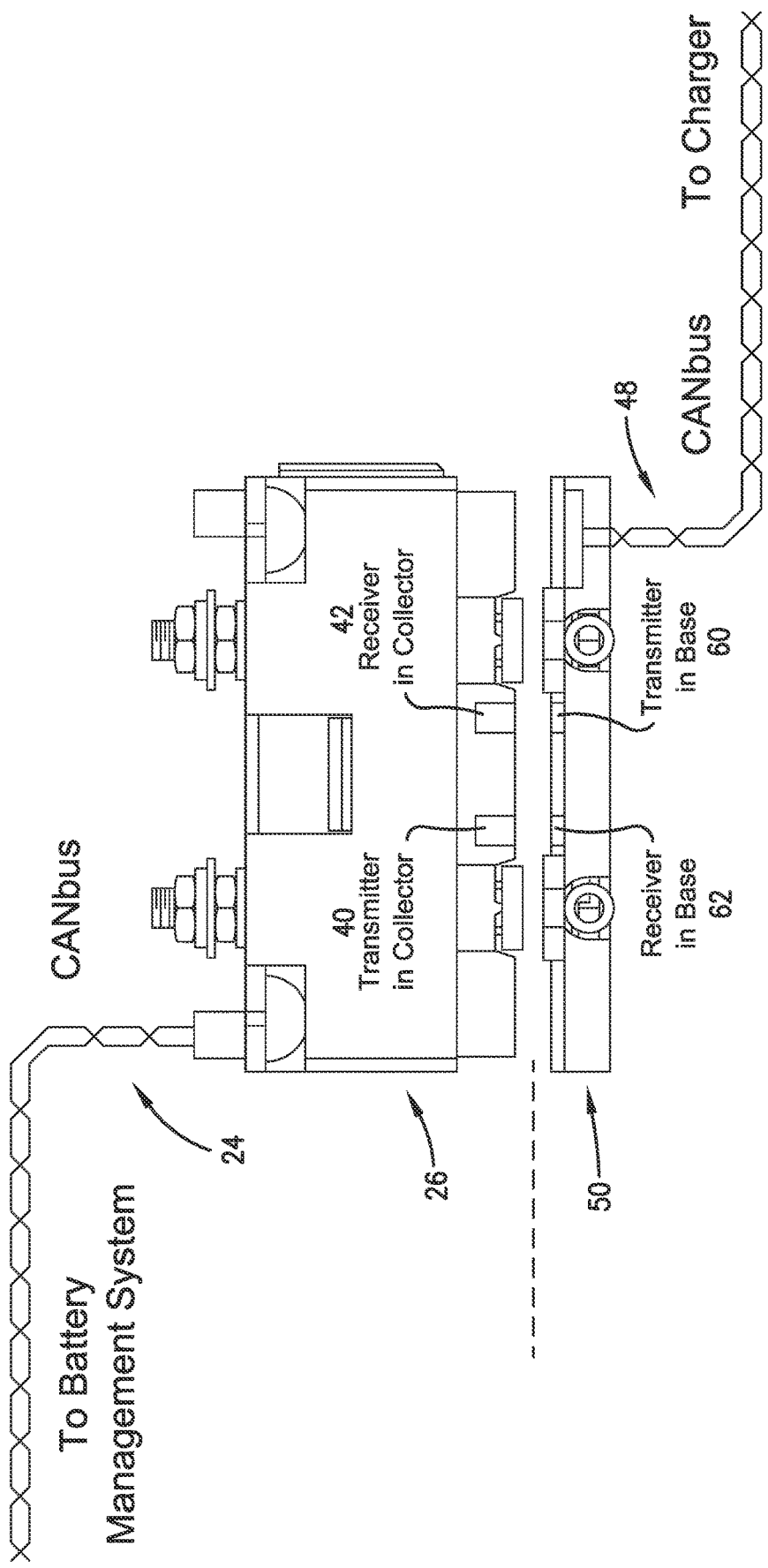
Figure 5:
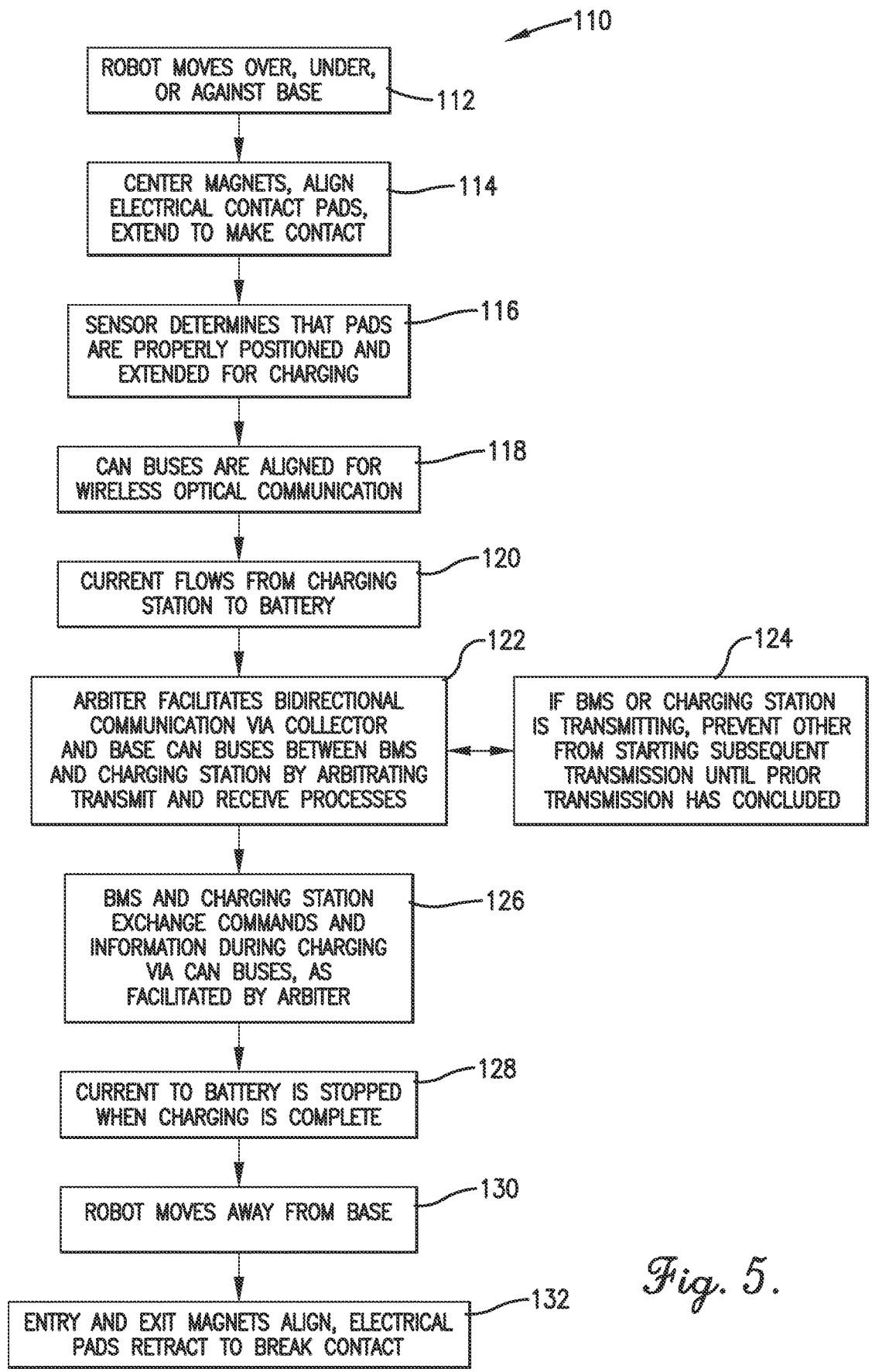

FIG. 4 is a fragmentary side elevation view showing the collector of FIG. 2 and the base of FIG. 3 operationally aligned for charging, wherein such alignment also operationally aligns and thereby facilitates the bidirectional optical communication of the system of FIG. 1; and FIG. 5 is a flowchart of steps in an embodiment of a method for arbitrating bidirectional optical communication between a mobile device and a charging station, wherein the method may reflect operation of the system of FIG. 1.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Broadly characterized, embodiments of the present invention provide an apparatus and method for facilitating bidirectional wireless optical communication between independent CAN buses by arbitrating transmit and receive processes to prevent the CAN buses from transmitting simultaneously across the optical link ends. Bidirectional transmission between independent CAN buses over an infrared (IR) wireless optical link with a clear air gap between the link ends can result in a bus conflict if both CAN buses attempt to transmit simultaneously. Embodiments of the arbiter apparatus and method of the present invention avoid this conflict by determining that one side is transmitting and blocking the dominant bit in the other direction, which causes the receiving side to wait until the transmitting side finishes transmitting and releases control of the bus. Once control is released, the arbiter recognizes the dominant bit from the other direction and allows it to transmit.

Potential applications include facilitating communication between a battery management system (BMS) and a battery charger, a robot or other automated guided vehicle and a computer, and a robot or other automated guided vehicle and a remote device. In one implementation involving communication between a robot BMS having a first CAN bus and a battery charging station having a second CAN bus, the charging station may include the arbiter circuit to mediate CAN bus exchanges up to two hundred fifty kilobytes-per-second over a twenty millimeter air gap regarding such relevant information as optimizing power delivery.

Referring to FIGS. 1-4, an embodiment of a system 10 is shown including an arbiter apparatus 12 which may be physically and operationally configured to arbitrate optical CAN bus communication between a mobile device 14 powered by a battery 16 and a battery charging station 18 for charging the battery 16.

Referring particularly to FIG. 1, the mobile device 14 may include the battery 16, an electric motor (not shown) powered by the battery 16, a battery management system 22 configured to monitor the battery 16, and a first CAN bus 24. In various implementations, the mobile device 14 may be an automated guided vehicle or an autonomous mobile robot.

Referring also to FIG. 2, the mobile device 14 may further include a collector 26 mounted on or otherwise incorporated into a surface of the mobile device 14. In one implementation, the collector 26 may include one or more electrical contact pads 28A,28B which are extendable and retractable, may include a collector center magnet 30 and collector entry and exit magnets 32A,32B, and may be communicatively coupled with the BMS 22 by the first CAN bus 24.

The first CAN bus 24 may include a first CAN transceiver 36 and a first optical link end 38 including a first set of transmit IR light emitting diodes (LEDs) 40 located behind a first collector optical window, and a first receive PIN photodiode 42 located behind a second collector optical window. The first optical link end 38 may be mounted on or incorporated into the collector 26.

The charging station 18 may be configured to charge the battery 16 of the mobile device 14, and may include a battery charger 46 and a second CAN bus 48. Referring also to FIG.

3, the charging station 18 may further include a base 50 mounted on or otherwise incorporated into a horizontal or vertical non-conductive surface over, against, or under which the mobile device 14 may move, and may be physically and operationally configured to cooperate with the collector 14 to charge the battery 16 aboard the mobile device 14. In one implementation, the base 50 may include a base center magnet 52 and base entry and exit magnets 54A,54B, and may be communicatively coupled with the battery charger 46 by the second CAN bus 48.

The second CAN bus 48 may include a second CAN transceiver 56 and a second optical link end 58 including a second set of transmit IR light emitting diodes (LEDs) 60 located behind a first base optical window, and a second receive PIN photodiode 62 located behind a second base optical window. The second optical link end 58 may be mounted on or incorporated into the base 50.

In one implementation, when the mobile device 14 moves to the charging station 18 such that the collector center magnet 30 is proximate to the base center magnet 52 the one or more electrical contact pads 28A,28B may extend to make electrical contact with the base 50 for charging the battery 16. Further, when the mobile device 14 moves away from the charging station 18 such that the collector center magnet 30 is no longer proximate to the base center magnet 52, the one or more electrical contact pads 28A,28B retract to break electrical contact with the base 50.

In one implementation, shown in FIG. 4, when the mobile device 14 moves to the charging station 18 such that the collector 26 is proximate to and operationally aligned with the base 50 for charging, the first optical link end 38 is aligned with the second optical link end 58. More specifically, the collector transmitter 40 is operationally aligned with the base receiver 62 for communication from the collector 26 to the base 50, and the base transmitter 60 is operationally aligned with the collector receiver 42 for communication from the base 50 to the collector 26. The first and second CAN buses 24,48 are configured to allow for bidirectional optical communication across the operationally aligned first and second optical link ends 38,58 between the BMS 22 and the charging station 18 regarding charging the battery. Such communication may include, for example, optimizing power delivery to the battery 16.

The arbiter apparatus 12 may be physically and operationally configured to facilitate wireless optical communication across the air gap between the CAN buses 38,58 by arbitrating the bidirectional optical communication such that a subsequent optical communication from one of the BMS 22 or the charging station 18 cannot proceed until a prior optical communication from the other has concluded. In one implementation, the arbiter apparatus 12 may be located in, on, or otherwise associated with the base 50 and operationally interposed between the two optical link ends 38,58.

In one implementation, the arbiter apparatus 12 prevents the subsequent optical communication from the one of the BMS 22 and the charging station 18 from proceeding until a dominant bit of the prior optical communication from the other is released, thereby preventing the first and second CAN buses 24,48 from attempting to simultaneously transmit across the first and second optical link ends 38,58.

Other embodiments and implementations of the system 10 may include more, fewer, or alternative components and/or perform more, fewer, or alternative actions, including those discussed elsewhere herein, and particularly those discussed in the following section describing the method 110.

Referring also to FIG. 5, an embodiment is shown of a method 110 for arbitrating bidirectional optical communication between the mobile device 14 and the charging station 18. The method 110 may reflect operation of the system 10 and may be implemented using components of the system 10 described above and shown in FIGS. 1-4.

As the mobile device 14 moves over, under, or against the base 18, as shown in step 112, when the collector center magnet 30 aligns with the base center magnet 52, the center magnets attract each other and cause the electrical contact pads 28A,28B of the collector 26 to quickly (~20 ms) extend and make electrical contact with the base 50 for charging, as shown in step 114.

In one implementation, a sensor in the electrical contact pads 28A,28B may determine when the pads 28A,28B are properly positioned relative to the base 50 of the charging station 18 for charging. Additionally or alternatively, a Hall effect sensor may be associated with the electrical contact pads 28A,28B and may change state when the pads 28A,28B extend or retract and thereby indicate when the pads 28A, 28B are extended or retracted. Thus, by detecting the charge voltage directly and/or by monitoring the Hall effect sensor in the electrical contact pads 28A,28B, the mobile device 14 can determine when it is in proper position relative to the base 50 of the charging station 18 for charging, as shown in step 116.

When the collector 26 is properly aligned with the base 50 for charging, the first optical link 38 of the first CAN bus 24 is properly aligned with the second optical link 58 of the second CAN bus 48 for wireless optical communication, as shown in step 118.

Current flows to the battery to charge it, as shown in step 120.

The arbiter apparatus 12 and method facilitates bidirectional wireless optical communication via the CAN buses 24,48 between the BMS 22 and the charging station 18 by arbitrating transmit and receive processes, as shown in step 122. In particular, if the BMS 22 or charging station 18 is transmitting, the arbiter apparatus 12 prevents the other from starting a subsequent transmission until the prior transmission has concluded, as shown in step 124.

The BMS 22 and the charging station 18 may exchange commands and information during charging in order to, for example, optimize power delivery (for example, to throttle the current as a function of the battery's charge and/or temperature), as facilitated by the arbiter apparatus 12 operationally interposed between the optical link ends 38,58, as shown in step 126.

When charging is complete, current to the battery 16 is stopped, as shown in step 128.

As the mobile device 14 moves away from the base 50, as shown in step 130, when the collector entry and exit magnets 32A,32B align with the base entry and exit magnets 54A, 54B, they repel each other and cause the electrical contact pads 28A,28B of the collector 26 to quickly (~20 ms) retract away from and break electrical contact with the base 50, as shown in step 132. This quick extension and retraction minimizes potentially damaging arcing which could otherwise occur.

Other embodiments and implementations of the method 110 may include more, fewer, or alternative steps and/or involve more, fewer, or alternative components, including those discussed elsewhere herein and particularly those discussed in the preceding section describing the system 10.

Although the invention has been described with reference to the one or more embodiments illustrated in the figures, it is understood that equivalents may be employed and sub-

Having thus described one or more embodiments of the invention, what is claimed as new and desired to be protected by Letters Patent includes the following:

1. A system comprising:
   a mobile device including a battery configured to provide power to an electric motor and a battery management system configured to monitor the battery, the battery management system being configured to communicate via a first controller area network bus having a first optical link end, the mobile device further including a collector, wherein the first optical link end is part of the collector, and the first optical link end includes a first transmit light emitting diode and a first receive photodiode;
   a charging station configured to charge the battery, the charging station being configured to communicate via a second controller area network bus having a second optical link end, the charging station including a base configured to cooperate with the collector to charge the battery, wherein the second optical link end is part of the base, and the second optical link end includes a second transmit light emitting diode and a second receive photodiode, and the mobile device moves to the charging station such that the collector is proximate to the base and the first optical link is operationally aligned with the second optical link end,
   wherein when the mobile device is operationally aligned with the charging station for charging the battery, the first and second controller area network buses are operationally aligned and configured to allow for bidirectional optical communication across the first and second optical link ends between the battery management system and the charging station regarding charging the battery; and
   an arbiter apparatus operationally interposed between the first and second optical link ends and configured to arbitrate the bidirectional optical communication via the first and second optical link ends by delaying a subsequent optical communication from one of the battery management system and the charging station until a prior optical communication from an other of battery management system and the charging station has concluded.

2. The system of claim 1, wherein the mobile device is an automated guided vehicle.

3. The system of claim 1, wherein the mobile device is an autonomous mobile robot.

4. The system of claim 1, wherein the bidirectional optical communication between the battery management system and the charging station concerns optimizing power delivery to the battery.

5. The system of claim 1, wherein the arbiter apparatus prevents the subsequent optical communication from the one of the battery management system and the charging station from proceeding until a dominant bit of the prior optical communication from the other of the battery management system and the charging station is released, thereby preventing the first and second controller area network buses from transmitting simultaneously across the first and second optical link ends.

6. The system of claim 1, wherein
   the collector includes one or more electrical contact pads which are extendable to make electrical contact with the base and retractable to break electrical contact with the base, and at least one collector magnet;
   the base includes at least one base magnet; and
   when the mobile device moves to the charging station such that the collector magnet is proximate to the base magnet the one or more electrical contact pads extend for charging the battery, and when the mobile device moves away from the charging station such that the collector magnet is no longer proximate to the base magnet the one or more electrical contact pads retract.

7. A system for arbitrating bidirectional optical communication between a mobile device and a charging station,
   the mobile device including a battery configured to provide power to an electric motor and a battery management system configured to monitor the battery, the battery management system being configured to communicate via a first controller area network bus having a first optical link end, the mobile device further including a collector, wherein the first optical link end is part of the collector, and the first optical link end includes a first transmit light emitting diode and a first receive photodiode; and
   the charging station configured to charge the battery, the charging station being configured to communicate via a second controller area network bus having a second optical link end, the charging station including a base configured to cooperate with the collector to charge the battery, wherein the second optical link end is part of the base, and the second optical link end includes a second transmit light emitting diode and a second receive photodiode, and the mobile device moves to the charging station such that the collector is proximate to the base and the first optical link is operationally aligned with the second optical link end,
   wherein when the mobile device is operationally aligned with the charging station for charging the battery, the first and second controller area network buses are operationally aligned and configured to allow for bidirectional optical communication across the first and second optical link ends between the battery management system and the charging station regarding charging the battery, the system comprising:
   an arbiter apparatus operationally interposed between the first and second optical link ends and configured to arbitrate the bidirectional optical communication via the first and second optical link ends by delaying a subsequent optical communication from one of the battery management system and the charging station until a prior optical communication from an other of battery management system and the charging station has concluded.

8. The system of claim 7, wherein the mobile device is an automated guided vehicle.

9. The system of claim 7, wherein the mobile device is an autonomous mobile robot.

10. The system of claim 7, wherein the bidirectional optical communication between the battery management system and the charging station concerns optimizing power delivery to the battery.

11. The system of claim 7, wherein the arbiter apparatus prevents the subsequent optical communication from the one of the battery management system and the charging station from proceeding until a dominant bit of the prior optical communication from the other of the battery management system and the charging station is released, thereby preventing the first and second controller area networks from transmitting simultaneously across the first and second optical link ends.

12. The system of claim 7, wherein
the collector includes one or more electrical contact pads which are extendable to make electrical contact with the base and retractable to break electrical contact with the base, and at least one collector magnet;
the base includes at least one base magnet; and
when the mobile device moves to the charging station such that the collector magnet is proximate to the base magnet the one or more electrical contact pads extend for charging the battery, and when the mobile device moves away from the charging station such that the collector magnet is no longer proximate to the base magnet the one or more electrical contact pads retract.

13. A method for arbitrating bidirectional optical communication between a mobile device and a charging station,
the mobile device including a battery configured to provide power to an electric motor and a battery management system configured to monitor the battery, the battery management system being configured to communicate via a first controller area network bus having a first optical link end, the mobile device further including a collector, wherein the first optical link end is part of the collector, and the first optical link end includes a first transmit light emitting diode and a first receive photodiode; and
the charging station configured to charge the battery, the charging station being configured to communicate via a second controller area network bus having a second optical link end, the charging station including a base configured to cooperate with the collector to charge the battery, wherein the second optical link end is part of the base, and the second optical link end includes a second transmit light emitting diode and a second receive photodiode, and the mobile device moves to the charging station such that the collector is proximate to the base and the first optical link is operationally aligned with the second optical link end,
wherein when the mobile device is operationally aligned with the charging station for charging the battery, the first and second controller area networks buses are operationally aligned and configured to allow for bidirectional optical communication across the first and second optical link ends between the battery management system and the charging station regarding charging the battery,
the method comprising:
interposing an arbiter apparatus between the first and second optical link ends; and arbitrating with an arbiter the bidirectional optical communication via the first and second optical link ends by delaying a subsequent optical communication from one of the battery management system and the charging station until a prior optical communication from an other of battery management system and the charging station has concluded.

14. The method of claim 13, wherein the mobile device is an automated guided vehicle.

15. The method of claim 13, wherein the mobile device is an autonomous mobile robot.

16. The method of claim 13, wherein the bidirectional optical communication between the battery management system and the charging station concerns optimizing power delivery to the battery.

17. The method of claim 13, the step of arbitrating including preventing the subsequent optical communication from the one of the battery management system and the charging station from proceeding until a dominant bit of the prior optical communication from the other of the battery management system and the charging station is released, thereby preventing the first and second controller area network buses from transmitting simultaneously across the first and second optical link ends.

* * * * *